No. 755,415. Patented March 22, 1904.

UNITED STATES PATENT OFFICE.

WILLIAM TRANTOM, OF NEW BRIGHTON, ENGLAND.

PROCESS OF PURIFYING BRINE.

SPECIFICATION forming part of Letters Patent No. 755,415, dated March 22, 1904.

Application filed November 25, 1902. Serial No. 132,784. (No specimens.)

*To all whom it may concern:*

Be it known that I, WILLIAM TRANTOM, commission merchant, a subject of the King of Great Britain, residing in New Brighton, in the county of Chester, England, (whose full postal address is 10 Field road, New Brighton, aforesaid,) have invented certain new and useful Improvements in the Purification of Brine and other Alkaline Chlorid Solutions, (for which application has been made in Great Britain, Provisional Application No. 23,642, dated October 29, 1902,) of which the following is a specification.

This invention has for its primary object the complete purification of ordinary brine, especially such brine as is used in electrolytic works for producing soda and chlorin. In these it is very desirable that the brine should be chemically pure. It is also useful for obtaining salt from brine for domestic and other purposes where great purity of product is desirable.

Further, the invention is useful for purifying chlorid of potassium or other alkaline chlorid salts or saline solutions from sulfate of lime and sulfate of magnesia or from the chlorids of calcium and magnesium.

The principal impurities in ordinary natural brine consist of the sulfates and the chlorids of calcium and magnesium.

I will describe my process first as it applies to a brine or chlorid-of-potassium solution containing all these salts. In order to precipitate the chlorids of calcium and magnesia, I add sulfate of soda to the brine or sulfate of potassium to the chlorid-of-potash solution. The chemical reactions in the case of brine when ordinary monosulfate of soda is used are as follows:

$$CaCl_2 + Na_2SO_4 = CaSO_4 + 2NaCl$$
$$MgCl_2 + Na_2SO_4 = MgSO_4 + 2NaCl,$$

the result being that the brine treated now resembles a natural brine in which all the lime and magnesia are in the form of sulfate of lime and sulfate of magnesia. If chlorid-of-potassium solution had been treated with sulfate of potassium, a similar result would have ensued. If in the brine there is a large amount of sulfate of magnesia, it may be desirable to save this magnesia. In such case I replace the magnesia compound with sulfuric acid by lime according to the equation $$MgSO_4 + Ca(OH)_2 = CaSO_4 + Mg(OH)_2.$$

The hydrate of magnesia being insoluble in the brine can now be separated by filtration or otherwise. The brine now containing only as impurities sulfate of lime, or if it has been not worth while to save the sulfate of magnesia also, I add to it freshly-precipitated carbonate of barium slightly in excess of the chemical equivalents of the sulfate of lime or sulfates of lime and magnesia present, thus forming sulfate of barium and carbonate of lime and (or) carbonate of magnesia, all of which substances are insoluble in the concentrated brine. The chemical reactions are as follows:

$$CaSO_4 + BaCO_3 = CaCO_3 + BaSO_4$$
$$MgSO_4 + BaCO_3 = MgCO_3 + BaSO_4.$$

The sulfate of baryta being insoluble is precipitated and can be removed, while a pure brine remains behind. A precisely similar process is adopted for a chlorid-of-potassium solution where operated upon, instead of chlorid of sodium.

In order to carry out the purification with such speed as to obtain practical results, I find it is necessary to use carbonate of barium which has been freshly precipitated and still moist, as in this condition it has great chemical activity by reason of its physical and possibly chemically-hydrated condition. It is at the same time insoluble in ordinary saline solutions, provided they do not contain free carbonic acid. I prepare the carbonate of barium for the purpose from the solution of a soluble salt of barium, either by treating it with an alkaline carbonate at or near the ordinary temperature or by any other known manner of precipitation. For the purposes of purification I do not allow this precipitated carbonate of barium to be dried, as by drying I find that its chemical activity is seriously diminished; but I use it in the moist condition, in which state it reacts with at least thirty to fifty times the rapidity of that of the same material after having been dried. It must be clearly understood that in referring to carbonate of barium in the course of this specification that the freshly-precipitated carbonate of barium prepared as described is the material which I use.

The precipitate obtained by treating the brine or other saline solution with carbonate of barium in the manner before described consists principally of sulfate of barium and carbonate of lime, together with carbonate of magnesia and any carbonate of barium which has not been converted into sulfate of barium. Provided that the treatment has been properly regulated the amount of unconverted carbonate of barium is practically *nil*. The mixed precipitate obtained as described I remove by settling or filter pressing and afterward treat with sulfuric acid or hydrochloric acid or carbonic acid or sulfurous acid, any of which dissolve out the carbonates of lime and magnesia, leaving sulfate of barium, which may be reduced with coal in the usual way and used to produce fresh carbonate of barium from the sulfid by treating with carbonic acid. I find it to be specially advantageous to use sulfurous acid for treating the precipitate as described; but I do not confine myself to any particular acid.

In describing the process in the case of brine it is obvious that other soluble chlorids of bases the sulfates of which are soluble can also be purified in the same manner, and the invention may also be used for nitrates of soda and other salts.

I claim as my invention—

1. The process for treating alkaline chlorid solutions, which consists in adding to the solution a sulfate of the alkali whose chlorid is to be purified in an amount chemically equivalent to the chlorids of calcium and magnesium present in the solution, then adding the chemical equivalent in lime of the deleterious amount of magnesia present whereby calcium sulfate is formed and magnesium hydrate is precipitated, then adding freshly-precipitated barium carbonate to the mass, the chemical equivalent of the amount of alkaline earth sulfate present in the solution, and lastly, treating the resulting sulfate of baryta so as to obtain further freshly-precipitated barium carbonate for further use.

2. The step in the purification of alkaline chlorid solutions, which consists in precipitating the alkaline earth sulfate by freshly-precipitated and still-hydrated carbonate of barium.

3. The step in the process of treating alkaline chlorid solutions, which consists in changing the chlorids of the alkaline earths present into sulfates by means of the sulfate of the alkali whose chlorid solution is to be treated, and then precipitating the sulfates by means of carbonate of barium.

In witness whereof I have hereunto signed my name, this 15th day of November, 1902, in the presence of two subscribing witnesses.

WILLIAM TRANTOM.

Witnesses:
WM. P. THOMPSON,
G. C. DYMOND.